May 12, 1964 H. W. GROTEWOLD 3,132,750
APPARATUS FOR PROCESSING FRUIT
Filed Aug. 1, 1960 5 Sheets-Sheet 1
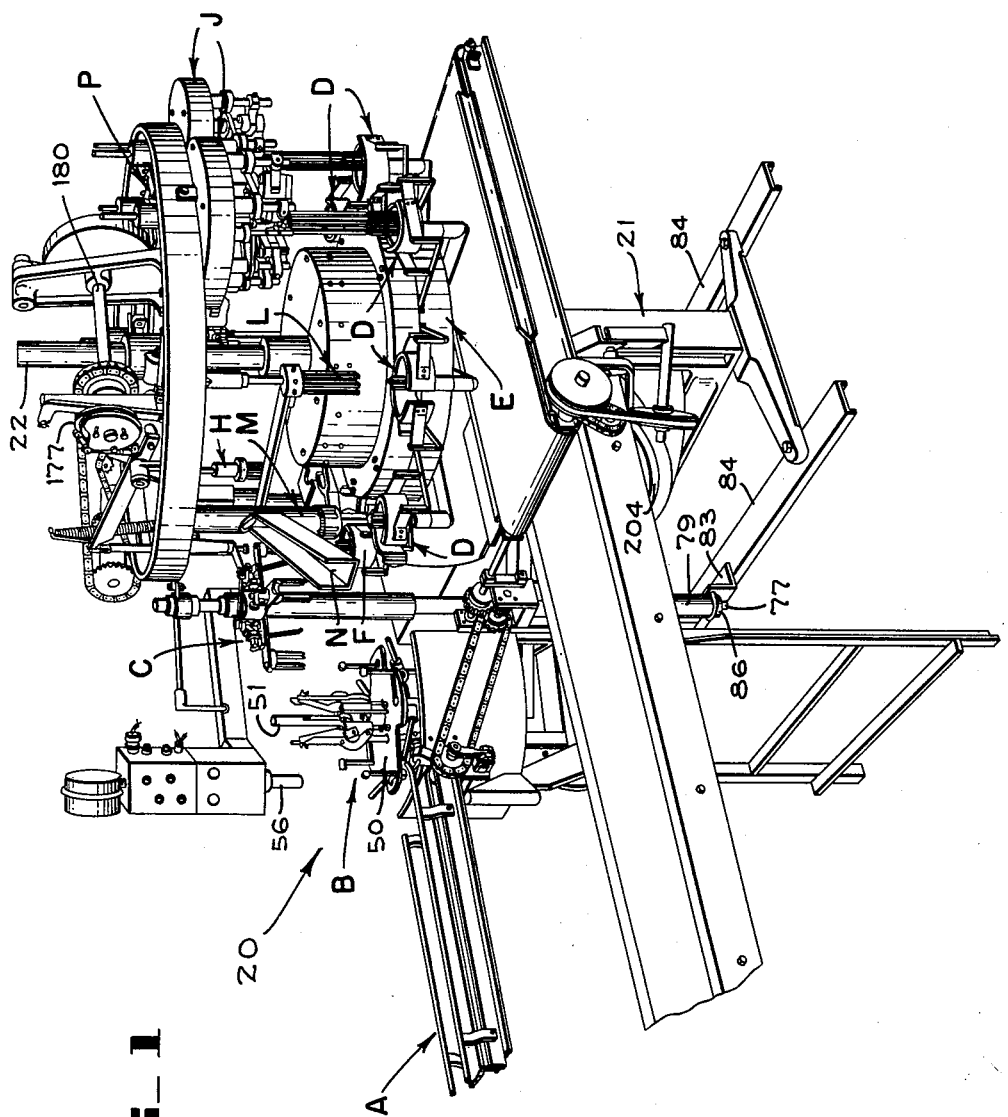
FIG_1
INVENTOR
HANS W. GROTEWOLD
BY
ATTORNEY

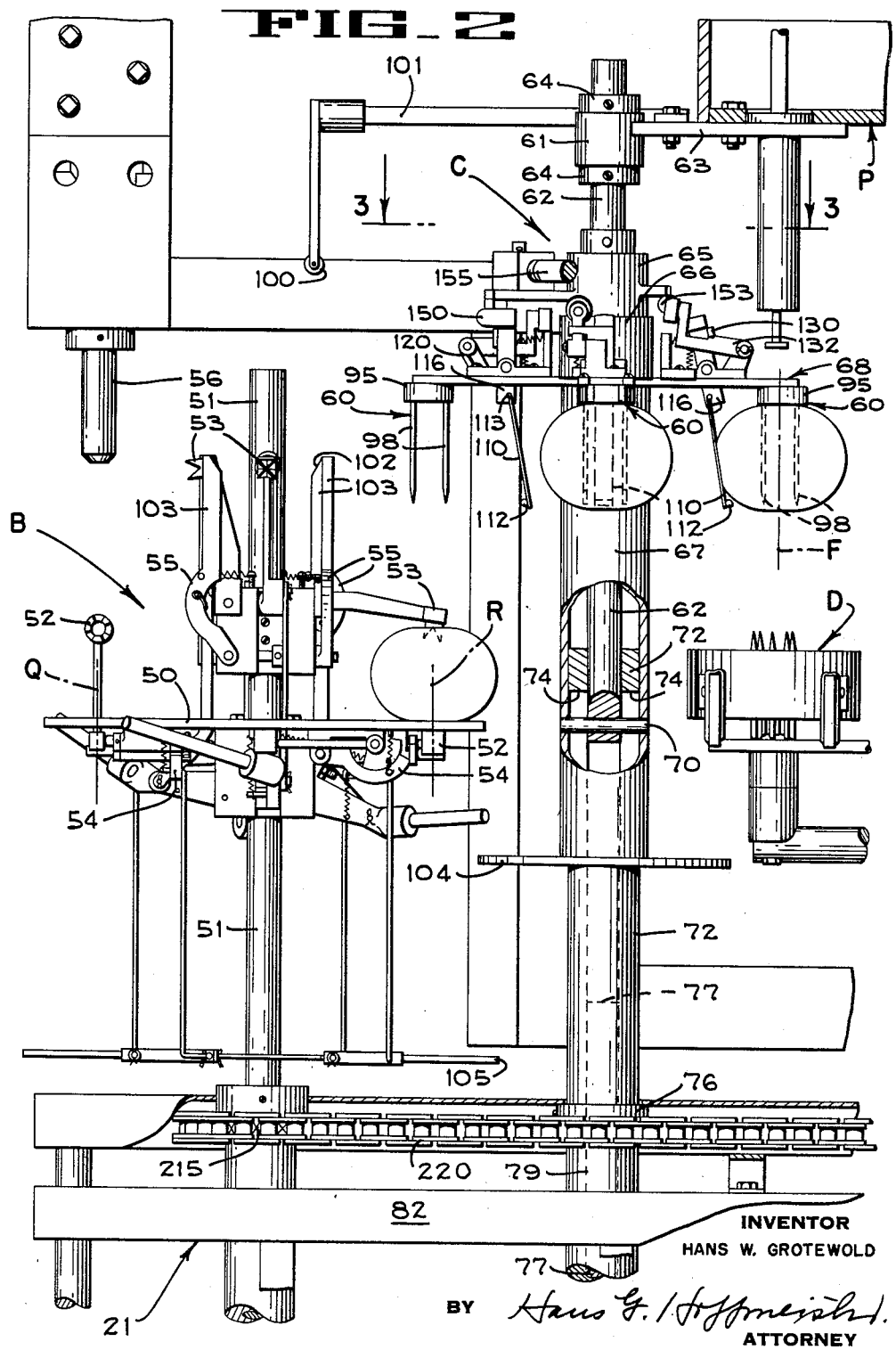

May 12, 1964      H. W. GROTEWOLD      3,132,750
APPARATUS FOR PROCESSING FRUIT
Filed Aug. 1, 1960      5 Sheets-Sheet 3
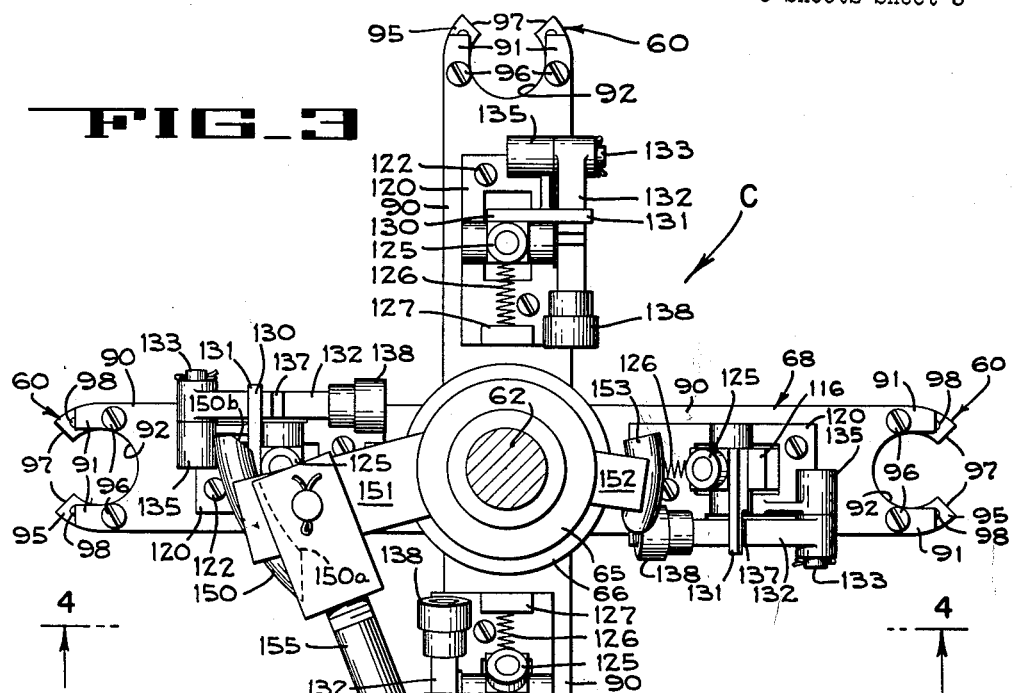
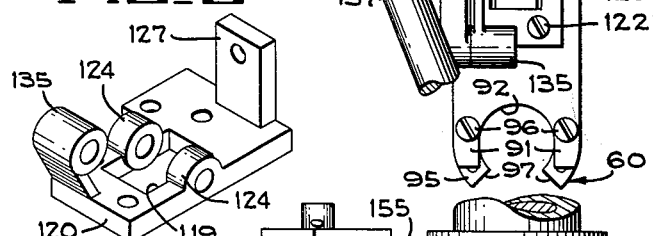
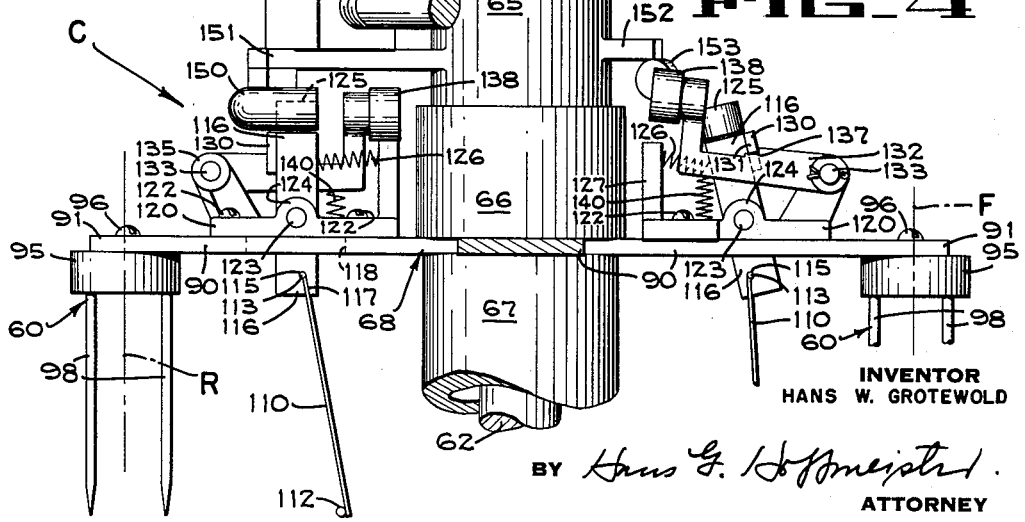
INVENTOR
HANS W. GROTEWOLD
BY Hans G. Hofmeister
ATTORNEY

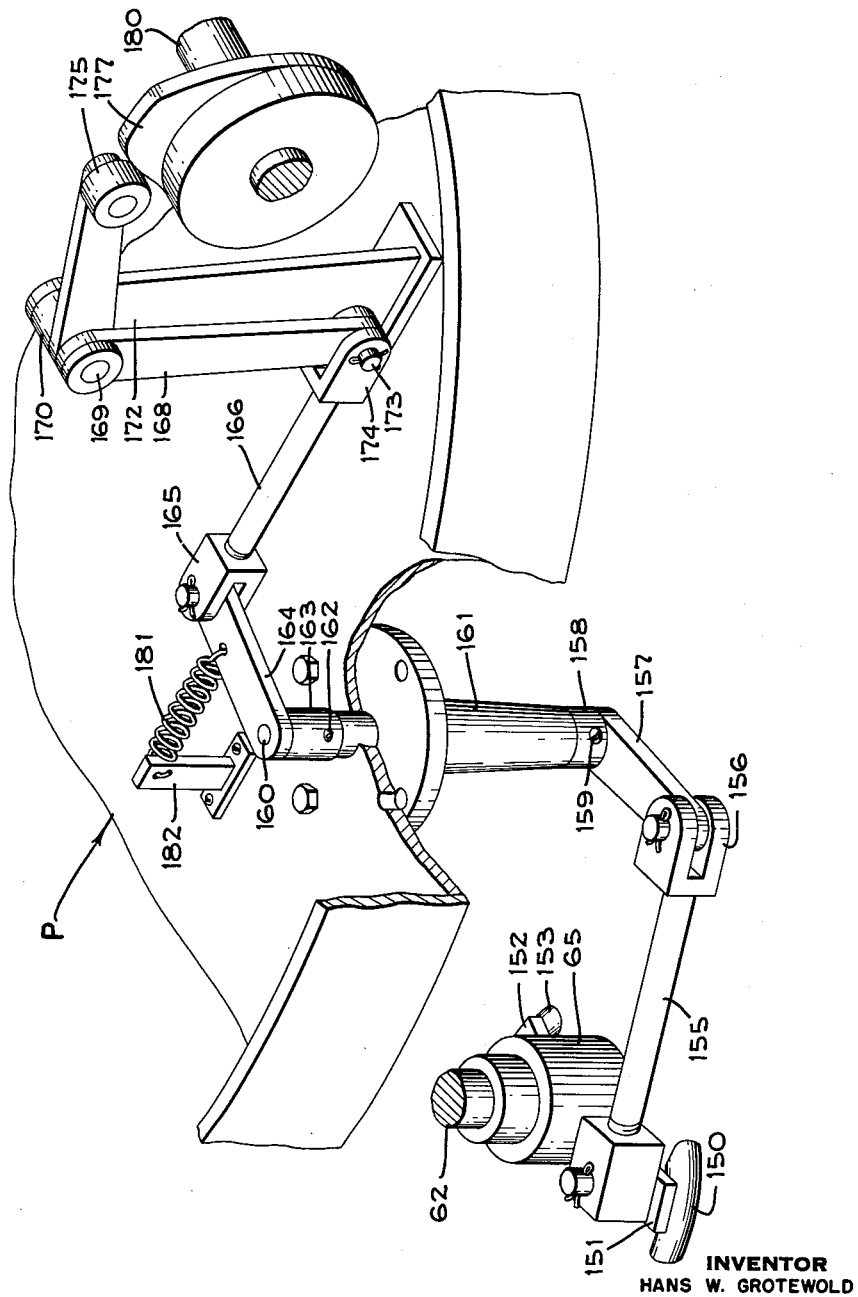

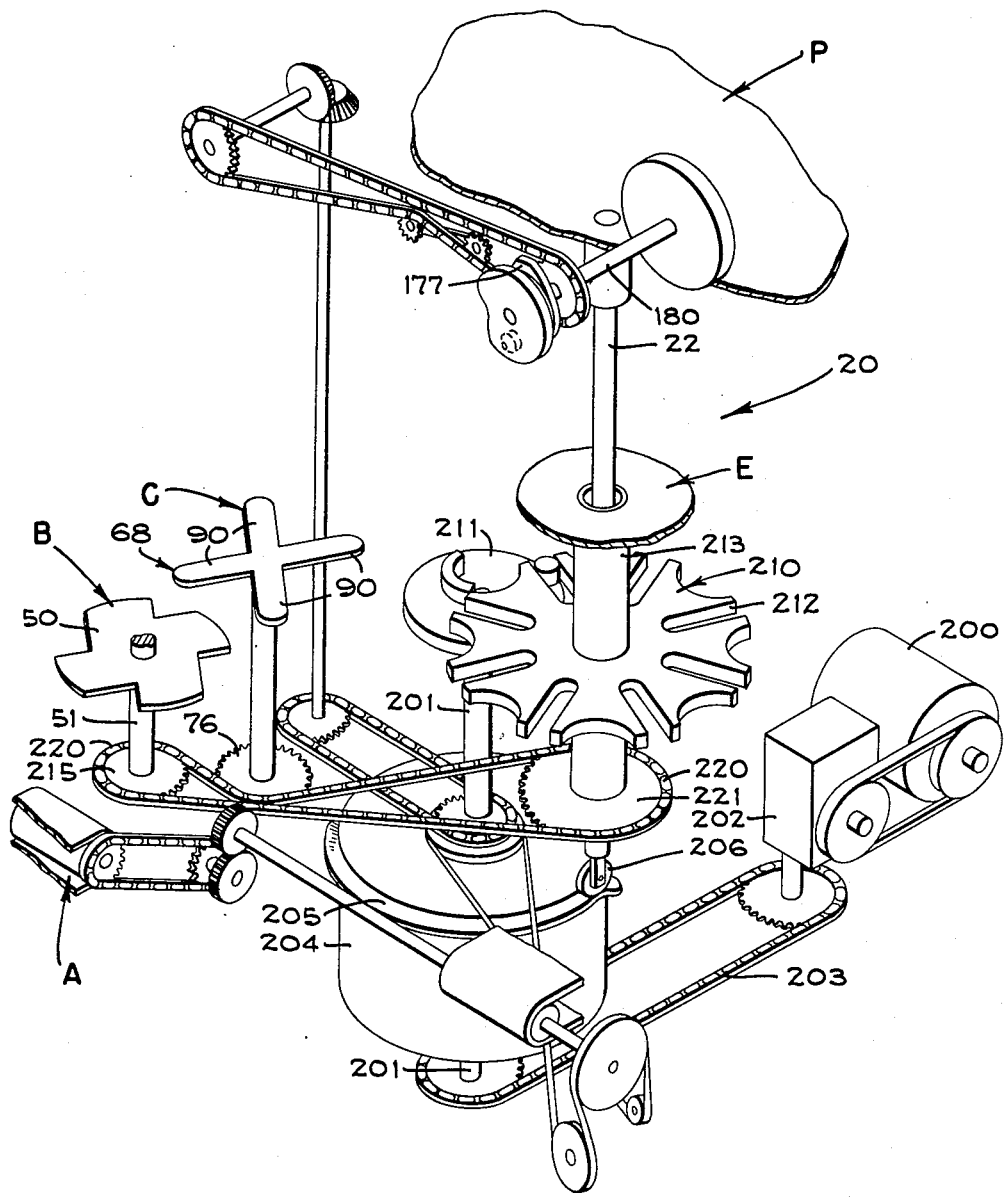

United States Patent Office 3,132,750
Patented May 12, 1964

3,132,750
APPARATUS FOR PROCESSING FRUIT
Hans W. Grotewold, Sebring, Fla., assignor to FMC Corporation, a corporation of Delaware
Filed Aug. 1, 1960, Ser. No. 46,662
4 Claims. (Cl. 214—1)

This invention pertains to fruit processing apparatus and more particularly concerns a mechanism for feeding fruit to a carrier of a rotary fruit processing machine.

An object of the present invention is to provide an improved mechanism for automatically transferring fruit from one rotary turret to another.

Another object of the invention is to provide a mechanism for automatically gripping and releasing fruit at predetermined intervals during the operation of a fruit processing machine.

Another object is to provide an improved mechanism for locking a fruit in fixed position on a turret so that it cannot shift position during rotation of the turret.

These and other objects of the present invention will become apparent from the following description taken in connection with the accompanying drawings, in which:

FIGURE 1 is a perspective of a grapefruit sectionizing machine in which the improved fruit handling mechanism of the present invention is incorporated.

FIGURE 2 is an enlarged fragmentary elevation of a portion of the machine of FIG. 1, with parts broken away.

FIGURE 3 is an enlarged horizontal section taken along line 3—3 of FIG. 2.

FIGURE 4 is a vertical section taken along line 4—4 of FIG. 3.

FIGURE 5 is a perspective of a bracket used in the mechanism shown in FIG. 4.

FIGURE 6 is a more or less diagrammatic perspective, with parts broken away, showing the drive mechanism of the transfer mechanism of the present invention.

FIGURE 7 is a diagrammatic perspective of the drive mechanism of the machine of FIG. 1.

Although the fruit handling mechanism of the present invention is useful in any installation where fruit is transferred from a feed mechanism to a processing unit, it is particularly adapted for use in a grapefruit sectionizing machine 20 (FIG. 1) of the type disclosed in the copending application of H. W. Grotewold Ser. No. 730,335, now U.S. Patent No. 3,072,160, issued January 23, 1963, The machine 20 of FIG. 1 is identical to that disclosed in the above-identified application except that the improved feed and transfer mechanism of the present invention has been substituted in machine 20 for a similar device used in the machine of said copending application. Accordingly, reference may be had to the above-identified Grotewold application for a complete description of any mechanisms not fully described hereinafter.

In general, the grapefruit sectionizing machine 20 comprises a belt type supply conveyor A on which peeled and treated whole grapefruit are delivered to a point within easy reach of an operator who stands adjacent a feed turret B. The feed turret B, and a transfer turret C are intermittently and simultaneously moved in 90° angular increments around vertical axes, the feed turret B moving clockwise while the transfer turret moves counter-clockwise. As will be explained presently, the transfer turret C, which is actually a second feed turret, removes each grapefruit from turret B and places it in a carrier D of a main processing turret E, which is mounted on a support structure 21 and is intermittently moved above the axis of a vertical shaft 22 in 45 degree angular increments. Accordingly, a grapefruit which is positioned in one of the carriers D at a transfer station F, is successively positioned under a vertically movable seed disturber unit H, then successively under four vertically movable sectionizing units J (two only being shown in FIG. 1) which are effective to loosen the pie shaped meat segments of the grapefruit from the radial membranes of the grapefruit to which they are naturally bonded. After leaving the fourth unit J, the grapefruit is positioned under a vertically movable rotary stripper L which moves down into engagement with the grapefruit and, upon being rotated, strips the loosened meat segments from the membranes. Finally at station M, the stripped core of the grapefruit is discharged from the machine through a chute N.

The vertical movements of the seed disturber unit H, the four segment loosening unit J, and the stripper L, are effected through a vertically movable tool carrier plate P which is lowered and then raised during the dwell interval between intermittent angular movements of the turrets.

Construction and operation of the feed turret B (FIGS. 1 and 2) is disclosed in detail in the above-mentioned Grotewold application. In general, this turret comprises a plate 50 secured to a rotatable shaft 51 for movement in 90° angular increments. The operator places a grapefruit on the plate 50 at station Q and centers and orients it by means of a pivotal pilot member 52 which swings down into the plane of the plate 50 and by means of a vertical beam of light that is projected downwardly from an overhead projector 56. The grapefruit is locked on the plate in oriented position by means of a pivotal locking lever 53 which engages the top surface of the fruit and holds it in fixed position during subsequent rotary movements of the plate 50. Latching mechanisms 54 and 55 hold the pilot member 52 and the locking lever 53 in position.

After two 90° angular movements of the plate 50, the grapefruit is brought to station R (FIG. 2) where a prong unit 60 of the transfer turret C is moved downwardly to impale the grapefruit so that, when the latches 54 and 55 are released and the transfer turret is raised, the grapefruit will be lifted from the feed turret plate 50. The transfer turret C comprises a vertical shaft 62 which is rotatably journalled near its upper end in a bearing 61 that is welded to a bracket 63 secured to the tool carrier plate P. Collars 64 are secured by setscrews to the shaft 62 on either side of bearing 61 so that vertical reciprocating movement of the bearing with the top plate P causes vertical reciprocation of the shaft 62. The shaft 62 extends downwardly through two hubs 65 and 66 (FIG. 4), the hub 66 having a tubular shaft 67 and a cross-shaped prong carrier plate 68 welded thereto. A pin 70 (FIG. 2) extends through an opening in the lower end of shaft 62 and into the side walls of the tubular shaft 67 so that the shaft 67 is secured to the turret shaft 62 for vertical reciprocating movement and rotary movement. A second tubular shaft 72 is disposed between the shaft 62 and shaft 67. This shaft 72 has a pair of diametrically opposed vertical slots 74 which receive the pin 70 and permit vertical movement of the shaft 62 relative to the shaft 72. The shaft 72 is setscrewed to a sprocket 76 (FIG. 7) and to a lower shaft 77 which is journalled for rotation in a vertical tubular bearing 79 that is welded in an opening in a structural channel 82 of the support structure 21 of the machine. Near its lower end, the bearing 79 is clamped to an angle bracket 83 (FIG. 1) that is welded to one of two base channels 84 of the support structure 21. A collar 86 is setscrewed to the lower shaft 77 at a point adjacent the lower end of the bearing 79. It will, therefore, be seen that, when the sprocket 76 is rotated, the shaft 72 rotates the prong carrier 68 and, when the shaft 62 is moved vertically, the prong carrier is also moved vertically.

The prong carrier 68 has four arms 90 (FIG. 3) spaced at 90 degree intervals and projecting radially outwardly from the hub 66. The outer end of each arm 90 is provided with two spaced fingers 91 defining a generally semicircular opening 92. A prong carrying ring 95, which is secured by setscrews 96 to each finger 91, is provided with an opening 97 at its outermost side, and with four equally spaced, downwardly projecting prongs 98 which make up the previously mentioned prong unit 60. When the tool carrier plate P moves downwardly, the prongs 98 pierce the grapefruit. The openings 97 at the outer end of the arms 90 and in the ring 95 are arranged to receive the outer end of the locking lever 53, permitting the undersurface of the ring 95 to move into contact with the top surface of the grapefruit. During the last part of the downward movement of the transfer turret C, a roller 100 (FIG. 2), that is mounted on an arm 101 secured to the tool carrier plate P, engages a camming edge 102 of a lever 103 of the latch mechanism 55, swinging the lever 103 outwardly to unlatch the mechanism and permit the locking lever 53 to be swung upwardly away from the grapefruit. Similarly a circular disc 104 on the tubular shaft 67 engages a linkage 105 to release latch 54.

The present invention is particularly concerned with an improved mechanism for automatically clamping the grapefruit on the prongs 98 when the prongs first engage the grapefruit, and automatically releasing the grapefruit when the transfer turret has been moved to station F (FIG. 2) and has moved downwardly to position the grapefruit within the carrier D. It will be appreciated that this automatic clamping and release of the grapefruit must take place in timed relation with the intermittent movements of the several turrets and with the vertical movements of the tool carrier plate P.

The clamping mechanism comprises a spring clamping arm 110 (FIG. 4) that is made of thin flat stock approximately two inches wide. A first short rod 112 is secured to the lower end of arm 110 and a second cylindrical rod 113, that is secured to the upper end of the clamping arm, is disposed in a cylindrical socket 115 in the lower end of a support lever 116. The upper portion of the clamping arm is disposed in a slot 117 in the lever 116. With this arrangement, the clamping arm 110 is movable into clamping engagement with a grapefruit on the prongs 98 when the lower end of the support lever is moved outwardly toward the prong unit and is moved out of clamping engagement with the grapefruit when the lower end of the support lever is moved toward the shaft 67.

The support lever 116 extends upwardly through an opening 118 in the associated prong carrier arm 90 and through an opening 119 in a bracket 120 (FIG. 5) that is secured by capscrews 122 (FIG. 4) to the arm 90. The lever 116 is pivotally mounted to the bracket 120 by a pivot pin 123 that extends through the lever and through bosses 124 in the bracket. Referring particularly to the clamping units illustrated at the right hand side of FIGURES 3 and 4, it will be noted that the support lever 116 has a roller 125 rotatably mounted on its upper end, and a compression spring 126 is connected between the lever 116 and an arm 127 projecting upwardly from the bracket 120. A latch arm 130 is fixed to the upper end of lever 116 adjacent the roller 125 and has an offset portion 131 projecting laterally above a latching lever 132 which is pivotally connected by pin 133 to a tubular member 135 projecting upwardly from bracket 120. The latching lever 132 has a detent 137 formed in its upper surface and a roller 138 rotatably mounted on its outer end. A compression spring 140 disposed between the undersurface of latching lever 132 and the bracket 120 urges the latch arm upwardly.

A latching cam 150 (FIGS. 3 and 4) is welded to one of two arms 151 and 152 which are secured to the hub 65. The other arm 152 carries an unlatching cam 153. An actuating link 155 (FIG. 3) is pivotally secured to the arm 151 so that, when the link 155 is reciprocated, in a manner which will be explained presently, the cams 150 and 153 are simultaneously moved, the cam 150 being effective to move one of the clamping arms 110 into engagement with a grapefruit and latching it in this position, at station R and the cam 153 being effective to unlatch the clamping arm of the opposite unit at station F.

It will be noted in FIG. 4 that, at station R, the lever 116 is disposed in a generally upright position so that the latching arcuate cam 150 whose inner camming surface has a trailing end portion 150a that is closer to the axis of hub 65 than is the leading edge 150b, engages the roller 125 and swings the upper end of the lever inwardly toward hub 66, compressing spring 126. As the upper portion of lever 116 moves toward the hub 66, the offset portion 131 of latch arm 130 rides along the upper surface of latching arm 132 until it reaches detent 137. At this point the spring 140 urges the latch lever 132 upwardly to engage the latch arm in the detent. The distance that the cam 150 pivots the lever 116 is such that the spring clamp arm 110 will be moved into clamping engagement with the smallest grapefruit being processed. The resiliency of the clamp arm 110 will permit the arm to adapt itself to fruit of different sizes.

Simultaneously with the latching of the clamp unit at station R, the unit at station F is released by the cam 153 which engages roller 138 and moves the latch lever 132 downwardly, permitting spring 126 to move the upper end of lever 116 outwardly and moving the clamp arm 110 inwardly of the turret and away from the grapefruit.

The link 155, which actuates the two cams 150 and 153, has a yoke 156 (FIG. 6) formed on one end that is pivotally connected to an arm 157. The arm 157 has a hub 158 that is secured by a setscrew 159 to a shaft 160 that is rotatably journalled in a bearing 161 bolted to and depending from the carrier plate P. At its upper end the shaft 160 is secured by a set screw 162 to the hub 163 of an arm 164 that is pivoted in a yoke 165 of a push rod 166. A bellcrank 168 is pivoted on a shaft 169 that is journalled in a bearing 170 formed on the upper end of a bracket 172 fixed to the plate P. One arm of the bellcrank is pivoted at 173 to a yoke 174 formed on push rod 166 and the other arm carries a roller 175 which is adapted to ride along the peripheral camming edge of a cam 177 that is keyed to a drive shaft 180. A spring 181 connected between the arm 164, and a tab 182 projecting upwardly from plate P, pivots the linkage in a direction to maintain the roller 175 in a contact with the cam 177. It will be evident that, as the shaft 180 is rotated, the link 155 will be reciprocated to oscillate the cams 150 and 153.

The shaft 180, as well as the drive shafts of the several turrets are driven by a drive mechanism that is disclosed in the above mentioned Grotewold application. In general, this drive mechanism includes a motor 200 which is connected to a vertical shaft 201 by means of a transmission unit 202 and a sprocket and chain drive 203. A barrel cam 204, which is keyed to shaft 201, is provided with a cam track 205 along which rides a roller 206 that is mounted on the lower end of the vertically movable shaft 22 on which the tool carrier plate P is mounted.

The shaft 201 is connected in driving engagement with the main turret E through a Geneva drive unit 210 which includes a Geneva driver 211 keyed to shaft 201, and a Geneva gear 212 that is keyed to a tubular shaft 213 to which the main turret E is clamped.

Similarly, the indexing movements of the feed turret B and the transfer turret C are coordinated with the movements of the main turret E and the plate P by means of a chain 220 which is trained around a sprocket 221, secured to the turret shaft 213, and around a sprocket 215 keyed to the feed turret shaft 51 and around sprocket 76 that is keyed to the transfer turret drive shaft. Accordingly, it will be evident that the several turrets are driven in timed relation and the shaft 180 actuates the cams 150 and 153 in timed relation with the rotary movement of the turrets and the vertical movement of the tool carrier plate P. Specifically, the arrangement is such that the cams 150 and 153 are actuated while all the turrets are stationary and the plate P is also stationary at its lowermost position.

From the foregoing description it will be recognized that the present invention provides an efficient mechanism for automatically transferring a grapefruit from one turret to another, a simple effective clamping unit for holding the grapefruit in place during its movement between turrets, and a unique fruit release mechanism.

It will be understood that modifications and variations may be effected without departing from the scope of the novel concepts of the present invention.

Having thus described the invention, what is claimed as new and desired to be protected by Letters Patent is:

1. In fruit processing apparatus, a turret, means defining a fruit support member on said turret, a fruit clamping lever pivotally mounted on said turret for movement between a position in clamping engagement with a fruit on said fruit support member and a position spaced from said support member, a latch arm on said clamping lever, a latching lever pivotally mounted on said turret and having a portion with a latch detent therein underlying said latch arm, means for rotating said turret to move said latching lever and said clamping lever along a circular path, first spring means operatively connected between said turret and said clamping lever for urging said lever away from fruit-clamping position, second spring means operatively connected between said latching lever and said turret for urging the latch detent portion of said latching lever upwardly toward said clamping lever, and actuating means mounted adjacent said turret for engaging said clamping lever and moving it to fruit clamping position against the resistance of said first spring means and moving said latch arm along the top surface of said latching lever against the resistance of said second spring means to a position wherein the latch arm of said clamping lever is disposed in latched engagement in said latch detent.

2. In fruit processing apparatus, a turret, means defining a fruit support member on said turret, a fruit clamping lever pivotally mounted on said turret for movement between a position in clamping engagement with a fruit on said fruit support member and a position spaced from said support member, a latch arm on said clamping lever, a latching lever pivotally mounted on said turret and having a portion with a latch detent therein underlying said latch arm, means for rotating said turret to move said latching lever and said clamping lever along a circular path, first spring means operatively connected between said turret and said clamping lever for urging said lever away from fruit-clamping position, second spring means operatively connected between said latching lever and said turret for urging the latch detent portion of said latching lever upwardly toward said clamping lever, and a cam movable in an arcuate path about the axis of rotation of said turret for engaging said clamping lever at a first sector of said circular path and pivoting it in a direction to move said clamping lever into engagement with a fruit on said fruit support member against the resistance of said first spring means and to move said clamping lever in a direction to engage and depress said latching lever against the resistance of said second spring means and move said latch arm into said latch detent, said cam being movable into contact with said latching lever at a subsequent sector of said circular path to depress said latching lever to move said detent away from said latch arm permitting said first spring means to pivot said clamping lever away from said fruit-clamping position and move said latch arm away from said latch detent.

3. In fruit processing apparatus, a turret, means defining a fruit support member on said turret, a fruit clamping lever pivotally mounted on said turret for movement between a position in clamping engagement with a fruit on said fruit support member and a position spaced from said support member, a latch arm on said clamping lever, a latching lever pivotally mounted on said turret and having a portion with a latch detent therein underlying said latch arm, means for rotating said turret to move said latching lever and said clamping lever along a circular path, first spring means operatively connected between said turret and said clamping lever for urging said lever away from fruit-clamping position, second spring means operatively connected between said latching lever and said turret for urging the latch detent portion of said latching lever upwardly toward said clamping lever, and a cam lever mounted above said turret for pivotal movement about the axis of said turret and having a pair of cams disposed on opposite sides of said axis, means for pivoting said cam lever to move one of said cams into engagement with said clamping lever at a first sector of said circular path to move said clamping lever into engagement with a fruit on said support member against the resistance of said first spring means and to move said clamping lever in a direction to engage and depress said latching lever against the resistance of said second spring means and move said latch arm into latched engagement with said latch detent, pivoting of said cam lever being effective to subsequently move the other of said cams into engagement with said latching lever to further depress said lever against the resistance of said second spring means to move said latch detent away from said latch arm to permit said first spring means to pivot said clamping lever away from said fruit support member to release the fruit and to move said latch arm away from said latch detent.

4. In fruit processing apparatus, support means, means defining a fruit support member on said support means, a fruit clamping lever pivotally mounted on said support means and having a fruit-contacting blade movable between a position in clamping engagement with a fruit on said fruit support member and a position spaced from said fruit support member, a latch arm on said clamping lever, first spring means operatively connected between said support means and said clamping lever and arranged to urge said clamping lever away from said fruit-clamping position, a latching lever pivotally mounted on said support means and having a portion with a latch detent in the upper surface thereof underlying said latch arm, second spring means disposed between said latching lever and said support means and arranged to urge said latching lever upwardly to hold the upper surface of said latching lever in engagement with said latch arm, the area of said lever surface that is held in engagement with said latch arm being spaced from said latch detent, and actuating means movable into engagement with said clamping lever to pivot said clamping lever in a direction to move said clamping blade into clamping engagement with the fruit and to move said arm in a direction to cause downward movement of said latching lever against the resistance of said second spring means, said latch arm being slidable along the upper surface of said latching lever during downward movement of said latching lever until said latch arm drops into said latch detent, said second spring means being effective to urge said latching lever upwardly to hold said latch arm in said detent.

References Cited in the file of this patent

UNITED STATES PATENTS

| | | |
|---|---|---|
| 2,389,259 | Halstead | Nov. 20, 1945 |
| 2,429,346 | Dunn | Oct. 21, 1947 |
| 2,431,310 | Coons | Nov. 25, 1947 |
| 2,939,572 | Wurgaft | June 7, 1960 |
| 3,030,990 | Polk | Apr. 24, 1962 |